(12) United States Patent
Lee et al.

(10) Patent No.: US 6,882,838 B1
(45) Date of Patent: Apr. 19, 2005

(54) SYSTEM AND METHOD FOR PROVIDING DYNAMIC CALL DISPOSITION SERVICE TO WIRELESS TERMINALS

(75) Inventors: Chinmei Chen Lee, Woodbridge, IL (US); Douglas William Varney, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/565,530

(22) Filed: May 5, 2000

Related U.S. Application Data (60) Provisional application No. 60/163,404, filed on Nov. 4, 1999.

(51) Int. Cl.[7] ............................................... H04M 3/42
(52) U.S. Cl. .................... 455/417; 445/414.1; 445/466; 379/211.01
(58) Field of Search .............................. 455/417, 414.1, 455/466, 445, 414, 553, 552, 432; 379/211.01, 211.02, 212.01, 213.01

(56) References Cited

U.S. PATENT DOCUMENTS

| | | | | |
|---|---|---|---|---|
| 5,841,854 A | * | 11/1998 | Schumacher et al. | ........ 455/554 |
| 5,966,653 A | * | 10/1999 | Joensuu et al. | ............. 455/414 |
| 6,154,644 A | * | 11/2000 | Murray | .................... 455/414.1 |
| 6,154,646 A | * | 11/2000 | Tran et al. | ................... 455/417 |
| 6,212,261 B1 | * | 4/2001 | Meubus et al. | .......... 379/88.12 |
| 6,392,999 B1 | * | 5/2002 | Liu et al. | ..................... 370/260 |
| 6,408,177 B1 | * | 6/2002 | Parikh et al. | ............... 455/414 |
| 6,553,222 B1 | * | 4/2003 | Weiss | ......................... 455/415 |

* cited by examiner

*Primary Examiner*—Tilahun Gesesse (57) ABSTRACT

A system and method for providing dynamic call disposition service to a wireless terminal that may be occupied or unoccupied. In response to a call to the wireless terminal in a voice domain, call disposition options are provided to the wireless terminal in a data domain. A call disposition action is then taken according to an option selection made at the wireless terminal as part of a cooperative effort between resources in the voice and data domains.

26 Claims, 5 Drawing Sheets

SYSTEM AND METHOD FOR PROVIDING DYNAMIC CALL DISPOSITION SERVICE TO WIRELESS TERMINALS

CROSS-REFERENCE TO RELATED APPLICATIONS

This application is related to, and claims benefit of the filing date of, Provisional Application Ser. No. 60/163,404, entitled "Data-Assisted Dynamic Treatment Of Incoming Calls for Wireless Subscribers," filed on Nov. 4, 1999.

STATEMENT REGARDING FEDERALLY SPONSORED RESEARCH OR DEVELOPMENT

Not Applicable

BACKGROUND OF THE INVENTION

1. Field of the Invention

This invention relates to wireless telecommunication systems. More particularly, the invention concerns the disposition of calls to wireless terminals in a wireless telecommunication system.

2. Description of the Prior Art

In wireless telecommunication systems, incoming call disposition to wireless terminals (e.g., call setup, call forwarding, announcement playing, etc.) has traditionally been handled automatically at the MSC (Mobile Switching Center) based on pre-determined rules. According to such processing, a static call disposition response is made for all calls regardless of their nature or perceived value to the subscriber. The subscriber is thus deprived of an opportunity to dynamically prioritize incoming communications or otherwise subjectively judge call importance. This is especially critical if the subscriber is already occupied with another call when a new call arrives.

The implementation of call waiting, call forwarding, and caller identification services represents one prior art response to this problem. Such services, however, do not provide detailed incoming call information, and they allow only pre-determined call disposition response options, i.e., the subscriber must either accept the call or reject it.

Another prior art response to the problem of dynamic call disposition has been to allow subscribers to download call disposition service logic to their wireless terminals. This approach, however, requires complicated management of the stored service logic, leading to high customer support costs for service providers. It is also cumbersome to introduce new services, upgrade old services, and install bug fixes. Moreover, a voice connection must be established between the MSC and the wireless terminal to communicate call disposition information. The subscriber is normally charged for this air time.

Still another prior art approach to the dynamic call disposition problem has been to provide such service through a voice circuit. More particularly, when a call is received at a subscriber's MSC, the MSC establishes a voice connection to the subscriber's mobile wireless terminal and plays an announcement containing call disposition choices. The subscriber's voice responses are then collected and decoded by a speech recognition circuit. If the wireless terminal is already engaged in another call, this approach requires a call waiting function to be implemented so that the subscriber will know to listen to the announcement. Again, the subscriber also normally incurs air time charges relative to the announcement connection.

Accordingly, there is an evident need for an improved dynamic call disposition service for wireless terminals, and especially those which are already occupied with existing calls, that overcomes the attendant disadvantages of the above-described prior art systems. What is required is an improved dynamic call disposition service that allows subscribers to dynamically control call disposition without having to manage complicated service logic at their wireless terminals and without the inconvenience and expense of voice channel announcement systems.

SUMMARY OF THE INVENTION

The foregoing problems are solved and an advance in the art is obtained by a novel system and method for providing dynamic call disposition service to a wireless terminal that may be occupied or unoccupied. The invention takes advantage of improving wireless technologies, and particularly the new data communication and micro-browsing capabilities now being added to wireless terminals, to implement a new class of data network-based dynamic call disposition service. In accordance with the invention, when a call is received for the wireless terminal in a voice domain, call disposition options are provided to the wireless terminal in a data domain. A call disposition action is then taken according to an option selection made at the wireless terminal as part of a cooperative effort between resources in the voice and data domains.

In preferred embodiments of the invention, the call disposition options are provided as a call disposition menu that is viewable in human-visible form as a micro-browser document or the like. The call disposition menu is sent to the wireless terminal from a data network server through a data network gateway, collectively representing a data network resource group. Advantageously, it does not matter whether the wireless terminal is occupied with an existing call or unoccupied. The data network server performs this function in response to a call disposition request message from the wireless terminal's mobile switching center and an intelligent network service control point, collectively representing a voice network resource group. In particular, when the mobile switching center receives a terminating call for the mobile terminal, it sends a trigger to the service control point. The service control point determines caller identification information and then generates and sends the call disposition request message to the data network server.

When the call disposition menu is displayed at the wireless terminal, a call disposition selection option input is made by the subscriber. Based on this input, the wireless terminal generates a result notification message. This message is sent through the data network gateway to the data network server. In response, the data network server generates a call disposition result message and sends it to the intelligent network service control point. Here, a call control message is generated and sent to the mobile switching center. The mobile switching center then performs a responsive call disposition action based on this message. Responsive actions may include delivering the call to the wireless terminal, tearing down the call, forwarding the call to a destination other than the wireless terminal, or connecting the call to an announcement playing resource.

In another aspect of the invention, an intelligent network service control point apparatus is disclosed for providing dynamic call disposition service. The service control point is adapted to receive a trigger in response to a call to a wireless terminal, generate a call disposition request message containing caller information in response to the trigger, and perform a call disposition action relative to the call according to an option selection made at the wireless terminal. The service control point apparatus may retrieve the caller information from a separate resource prior to generating the call disposition request message. The call disposition action taken by the intelligent network service control point preferably includes receiving a call disposition result message from a data network server and generating a call control message to a mobile switching center.

In yet another aspect of the invention, a data network server is disclosed for providing dynamic call disposition service. The data network server is adapted to receive a call disposition request message containing caller information in response to a call to a wireless terminal, form a call disposition menu in response to the call disposition request message, and perform a call disposition action relative to the call according to an option selection made at the wireless terminal. The call disposition action preferably includes receiving a result notification message from the wireless terminal and generating a call disposition result message that is sent to an intelligent network service control point.

In still another aspect of the invention, a wireless terminal is disclosed for providing dynamic call disposition service. The wireless terminal is adapted to receive and display a call disposition menu in human-visible form, receive an option selection input from the subscriber corresponding to a selected option in the call disposition menu, generate and then send a result notification message based on the option selection input to the data network server.

BRIEF DESCRIPTION OF THE DRAWING

The foregoing and other features and advantages of the invention will be apparent from the following more particular description of preferred embodiments of the invention, as illustrated in the accompanying Drawing, in which.

DETAILED DESCRIPTION OF THE PREFERRED EMBODIMENT

Figure 1:
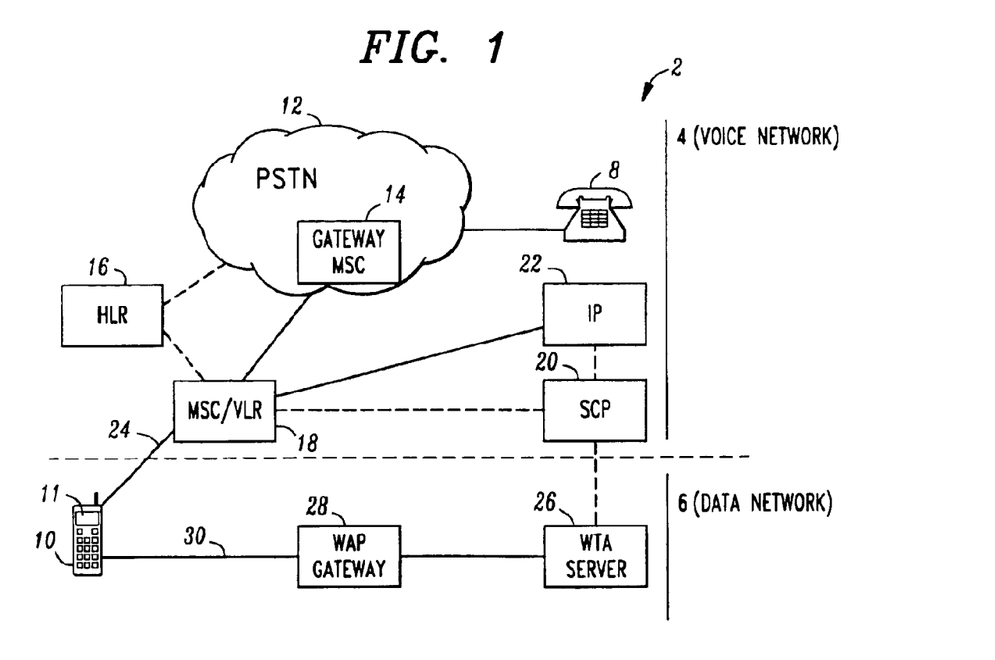
FIG. 1 is a functional block diagram showing a network architecture for a wireless telecommunication system that provides dynamic call disposition service in accordance with the invention.

Turning now to the figures, wherein like reference numerals represent like elements in all of the several views, FIG. 1 illustrates a network architecture for a wireless telecommunication system 2 that provides dynamic call disposition service in accordance with the present invention. As shown, the telecommunication system 2 includes voice network resources 4 and data network resources 6. The voice network resources 4 may be implemented in a conventional telephone network that includes wireless access capability, while the data network resources 6 may be implemented in a conventional packet data network, such as a network operating with an IP (Internet Protocol) network layer protocol, an ATM (Asynchronous Transfer Mode) link layer protocol, or both. Alternatively, the voice and data network resources 4 and 6 could be implemented as part of an integrated communication network having features found in both conventional telephone and packet data networks. In FIG. 1, the solid-line resource interconnections represent voice or data traffic pathways, while the dashed-line resource interconnections represent signaling message pathways.

In the architecture of FIG. 1, a caller operating subscriber equipment 8 (such as a wireline telephone) is assumed to initiate a call to a called party operating a wireless terminal 10 as a wireless subscriber. The wireless terminal 10 may already be occupied with another call, or it may be unoccupied. The wireless terminal 10 comprises an integrated wireless telephone and software-controlled data terminal, which preferably implements a WAP (Wireless Application Protocol) micro-browser, or the like, to display WML (Wireless Markup Language) documents on a display 11. There are a variety of such products on the market today, and others in development.

The voice network resources 4 used to set up a call from the subscriber equipment 8 to the wireless terminal 10 include a PSTN (Public Switched Telephone Network) 12, a Gateway MSC 14, an HLR (Home Location Register) 16, an MSC/VLR (Visitor Location Register) 18, and an intelligent network SCP (Service Control Point) 20. The voice network resources 4 may also include an IP (Intelligent Peripheral) 22 for playing announcements, as described in more detail below. Except to the extent that their software programming is modified to perform the functions of the invention, as described in more detail below, each of the foregoing voice network resources 4 is well known in the art. It will be further appreciated that the voice network wireless resources of FIG. 1 can be implemented using any $2^{nd}$ Generation or $3^{rd}$ Generation wireless voice communication technologies, including IS-54-B (D-AMPS), IS-136, PCS-1900, DCS 1800 (GSM 1800) GSM 900, IS-95, W-CDMA, GPRS, UMTS, IMT2000, and Mobile IP. The air interface pathway for voice communication is shown in FIG. 1 by reference numeral 24.

The data network resources 6 of FIG. 1 include a data network server and a data network gateway. More particularly, the data network server is preferably a WTA (Wireless Telephony Application) Server 26 implemented in accordance with the Wireless Application Protocol, and the data network gateway is preferably a WAP Gateway 28. Except to the extent that their software programming is modified to perform the functions of the invention, as described in more detail below, each of the foregoing data network resources is well known in the art. As in the case of the voice network wireless resources described above, the data network wireless resources of FIG. 1 can be implemented using any $2^{nd}$ Generation or $3^{rd}$ Generation wireless voice communication technologies, including IS-54-B (D-AMPS), IS-136, PCS-1900, DCS 1800 (GSM 1800) GSM 900, IS-95, W-CDMA, GPRS, UMTS, IMT2000, and Mobile IP. The air interface pathway for data communication is shown in FIG. 1 by reference numeral 30.

Figure 2A:
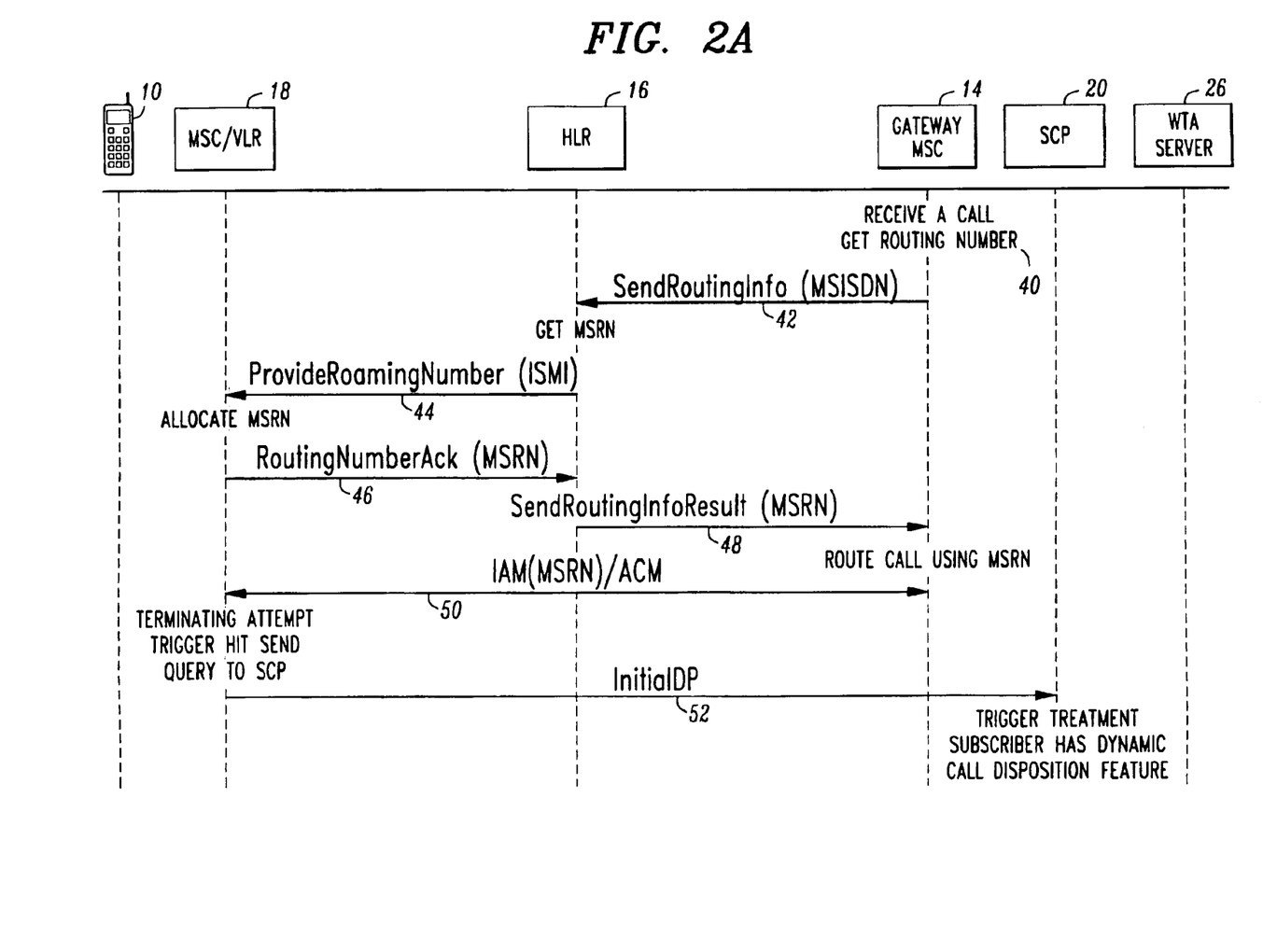
FIG. 2a is a flow diagram showing a method steps performed in a first phase of dynamic call distribution service in the telecommunication system of FIG. 1 wherein an incoming call results in a trigger being sent to an intelligent network service control point.
Figure 2B:
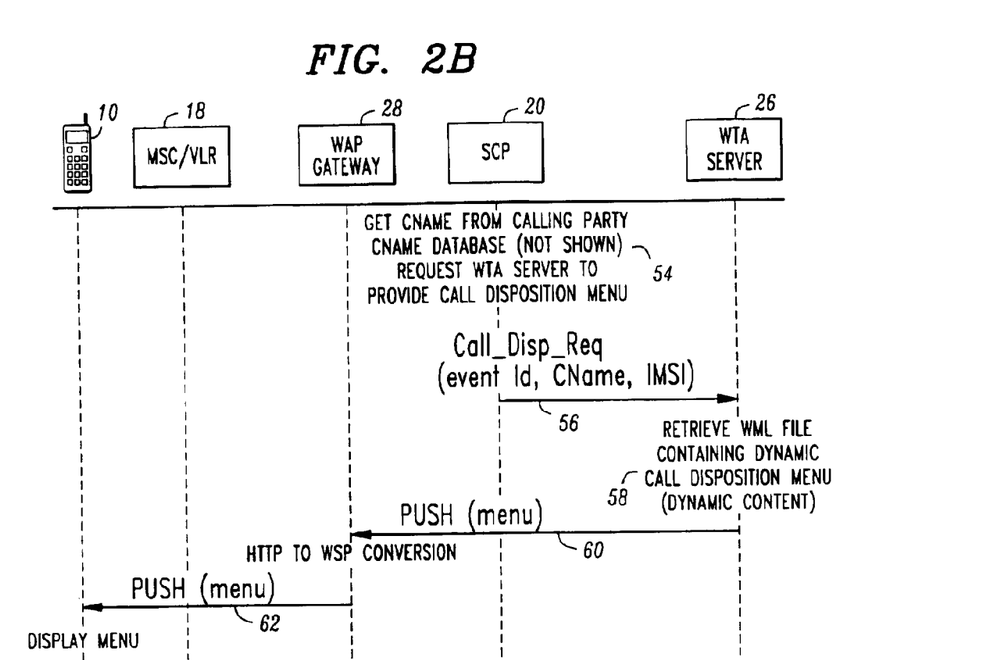
FIG. 2b is a flow diagram showing a continuation of the method steps shown in FIG. 2a wherein an incoming call results in a call disposition menu being retrieved and sent to a wireless terminal.

Referring now to FIGS. 2a and 2b, the processing steps performed in response to a call being initiated by the subscriber equipment 8 to the wireless terminal 10 will be described. In the discussion that follows, various signaling messages are described using GSM naming conventions. This is done by way of example only. When possible, alternative message names for other protocols are also set forth as a reminder that the invention is not limited to any single wireless communication protocol.

In a first processing step 40, the call from the subscriber equipment 8 is conventionally setup through the PSTN 12 to the Gateway MSC 14, which is a gateway switch at the boundary of PSTN and the mobile network. In step 42, the Gateway MSC 14 performs the usual MSISDN (Mobile Station ISDN Number) lookup for the wireless terminal 10 and sends the MSISDN to the HLR 16 in a conventional SendRoutingInfo message, also known as location request message. As is known, the HLR needs to obtain an MSRN (Mobile Station Routing Number) that identifies an inter-MSC route to the MSC/VLR that last provided registration information about the wireless terminal 10. In accordance with FIG. 1, this is the MSC/VLR 18. In step 44, the HLR 16 sends a conventional ProvideRoamingNumber message, also known as a routing request invoke message, to the MSC/VLR 18. As is known, this message contains an IMSI (International Subscriber Mobile Identifier) for the wireless terminal 10. The MSC/VLR then allocates an MSRN and in step 46 sends the MSRN to the HLR 16 in a conventional RoutingNumberAck message, also known as a routing request response message. In step 48, the HLR 16 forwards the MSRN to the Gateway MSC 14 in a conventional SendRoutingInfoResult message, also know as a location request response message. As persons skilled in the art will appreciate, the Gateway MSC is now ready to set up a voice connection to the MSC/VLR 18.

In step 50, the Gateway MSC 14 sends a terminating attempt to the MSC/VLR 18. This is a conventional IAM (Initial Address Message). Also in step 50, the MSC/VLR 18 acknowledges receipt of the IAM with a conventional ACM (Address Complete Message).

In a prior art voice network, several alternative actions could have been taken during the foregoing processing to implement features such as call forwarding, busy condition processing, call waiting, and announcement generation. Relative to call forwarding, which is unconditional in the prior art, the HLR 16 would normally store a database file that indicates whether call forwarding is active, and if so, it would also store the forwarding number. In response to the SendRoutingInfo message of step 42, the HLR would advise the Gateway MSC 14 of the call forwarding information so that the incoming call could be rerouted. Relative to busy condition processing, the MSC/VLR 18 would respond to the ProvideRoamingNumber message of step 44 by advising the HLR 16 that the mobile terminal is busy. A busy signal would then be returned to the subscriber equipment 8. To implement call waiting, the MSC/VLR 18 would respond to the IAM/ACM exchange of step 50 by sending a tone to the wireless terminal 10 and setting up a connection for the incoming call if the subscriber elected to receive it. To implement announcement generation, the incoming call could be connected to an announcement playing resource, such as the IP 22, at any point during the foregoing processing to advise the calling party of a condition (e.g., the wireless terminal 10 is not answering, etc.).

In accordance with the invention, none of the foregoing alternative processing actions is performed while the wireless terminal 10 is in service and capable of receiving messages. Rather, the processing of steps 40–50 is performed such that the MSC/VLR is presented with the terminating attempt trigger, and is ready to act in response thereto. At this point, the MSC/VLR 18 sends an intelligent network trigger to the SCP 20 in step 52. This trigger is identified in FIG. 2a as an InitialDP (Initial Detection Point) trigger. The purpose of the trigger is to query the SCP 20 to determine how to dispose of the call. For purposes of the present discussion, it is assumed that the SCP determines that the wireless terminal 10 subscribes to the dynamic call disposition service of the invention, and invokes that service in response to the incoming call.

Turning now to FIG. 2b, when the SCP 20 receives the InitialDP trigger from the MSC/VLR 18 it may, in step 54, query a CName (Calling Name) database (not shown) to determine the name of the calling party based on the calling telephone number. The SCP is further programmed to generate a Call_Disp_Req (Call Disposition Request) message containing an event identification (eventId) value, the caller's CName and/or the calling telephone number, and an identifier for the wireless terminal 10. The latter could be the subscriber's IMSI (International Mobile Subscriber Number), the wireless terminal's MIN (Mobile Identification Number) or any other suitable identifier. In step 56, the SCP 20, according to its programming, sends the Call_Disp_Req message to the WTA Server 26, whose data network URL is known to the SCP based on pre-stored information.

The WTA Server 26 is programmed to receive the Call_Disp_Req message from the SCP 20 and, in step 58, to formulate a WML (or HTML) file containing the calling party's CName and a call disposition menu. In step 60, according to its programming, the WTA Server sends the call disposition menu to the WAP Gateway 28 using a conventional WAP transfer operation known as a PUSH.

The WAP Gateway 28 is programmed to receive the call disposition menu from the WTA server. If necessary (i.e., if the call disposition menu is in a format other than WML, such as HTML), the WAP Gateway can adapt the call disposition menu according to the characteristics of the wireless terminal's display software to facilitate proper display of the menu. In step 62, according to its programming, the WTA Gateway 28 PUSHs the call disposition menu to the wireless terminal 10.

The wireless terminal 10 has a mini-browser that is programmed to receive the call disposition menu from the WAP Gateway 28 and to display the menu in human-visible form on the display 1. The wireless terminal 10 is further programmed to receive a selection option input (from the wireless subscriber) that corresponds to a selected option on the menu. The wireless terminal 10 then generates a result notification message according to the selection option input.

The remainder of the call disposition processing depends on the call disposition option selected by the wireless subscriber. FIGS. 3a–3d illustrate four possible scenarios, in which the wireless subscriber elects to answer the call, reject the call, forward the call, or play an announcement, respectively.

Figure 3A:
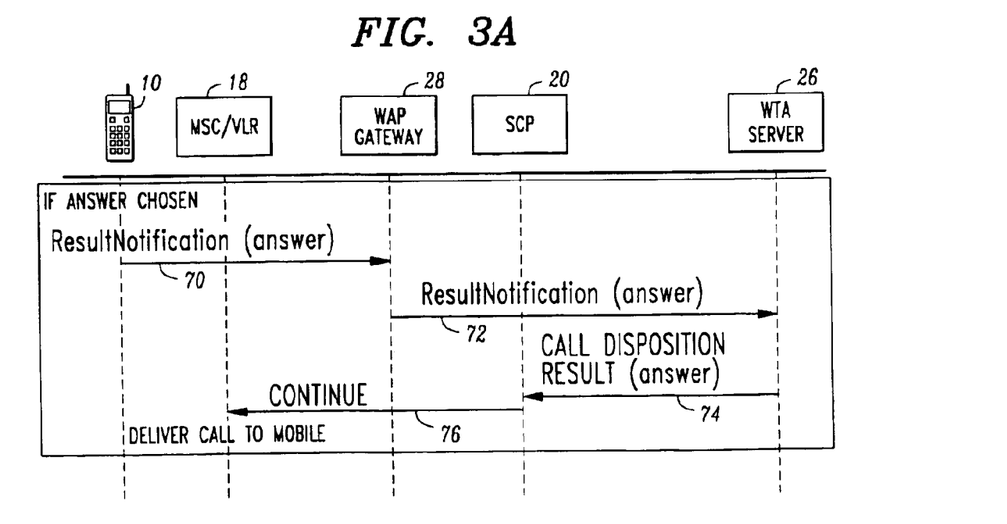
FIG. 3a is a flow diagram showing method steps performed in a second phase of dynamic call distribution service in the telecommunication system of FIG. 1 wherein call disposition is performed in response to a subscriber's call-answer selection.

Turning now to FIG. 3a, if the wireless subscriber elects to answer the call, the wireless terminal 10, according to its programming, generates and sends a corresponding ResultNotification message (answer) to the WAP Gateway 28 in step 70. In turn, the WAP Gateway 28 is programmed to receive the ResultNotification message (answer) from the wireless terminal 10 and forward it to the WTA Server 26 in step 72. There, according to its programming, the WTA Server 26 generates a Call Disposition Result message (answer), and sends this message to the SCP 20 in step 74. The SCP 20 is programmed to receive the Call Disposition Result message (answer) from the WTA Server 26, generate a call control message (Continue), and send this message to the MSC/VLR in step 76. The MSC/VLR then performs a responsive call disposition action, i.e., it delivers the call to the wireless terminal 10 in conventional fashion.

Figure 3B:
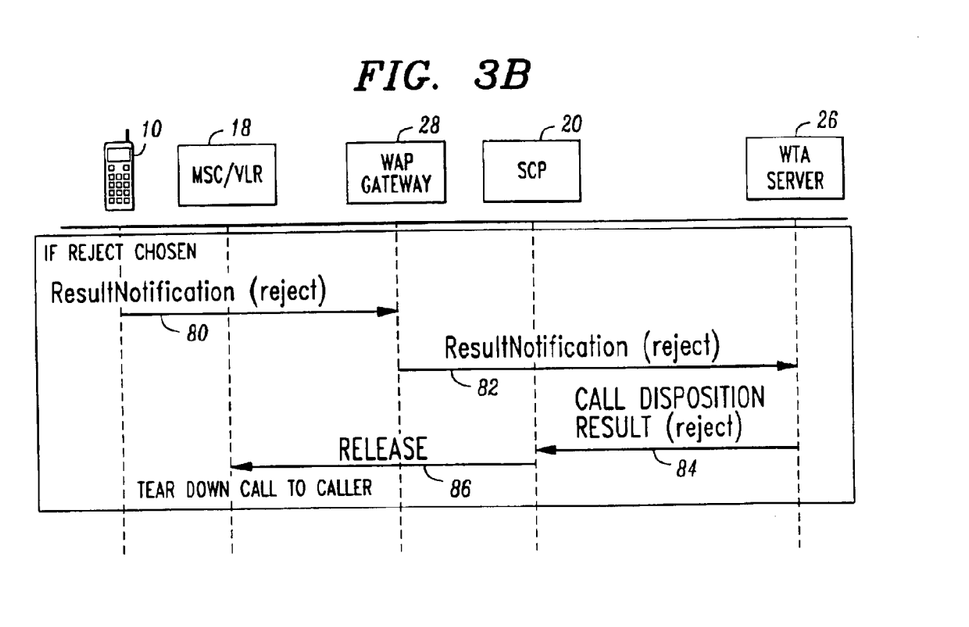
FIG. 3b is a flow diagram showing method steps performed in a second phase of dynamic call distribution service in the telecommunication system of FIG. 1 wherein call disposition is performed in response to a subscriber's call-reject selection.

Turning now to FIG. 3b, if the wireless subscriber elects to reject the call, the wireless terminal 10, according to its programming, generates and sends a corresponding ResultNotification message (reject) to the WAP Gateway 28 in step 80. In turn, the WAP Gateway 28 is programmed to receive the ResultNotification message (reject) from the wireless terminal 10 and forward it to the WTA Server 26 in step 82. There, according to its programming, the WTA Server 26 generates a Call Disposition Result message (reject), and sends this message to the SCP 20 in step 84. The SCP 20 is programmed to receive the Call Disposition Result message (reject) from the WTA Server 26, generate a call control message (Release), and send this message to the MSC/VLR in step 86. The MSC/VLR then performs a responsive call disposition action, i.e., it tears down the call to the caller in conventional fashion.

Figure 3C:
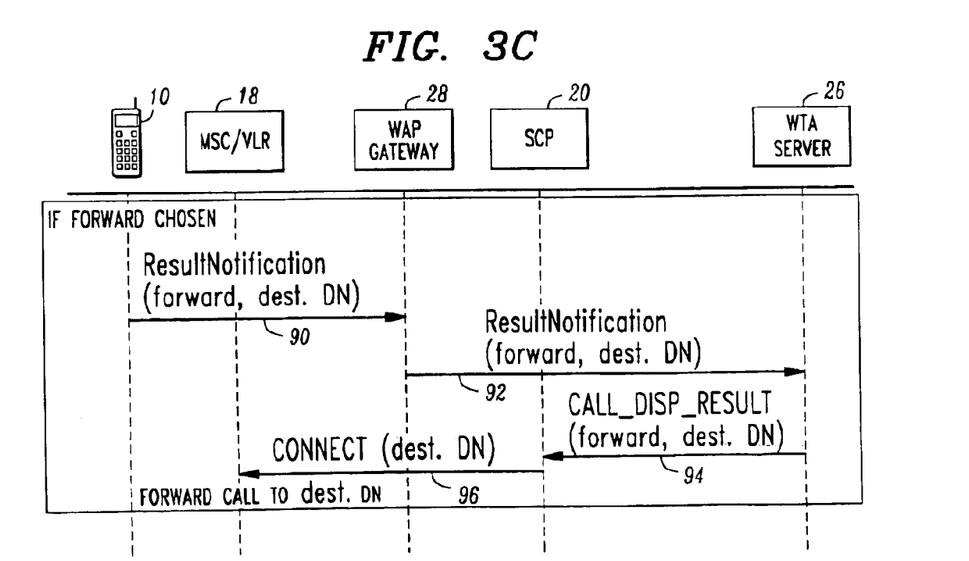
FIG. 3c is a flow diagram showing method steps performed in a second phase of dynamic call distribution service in the telecommunication system of FIG. 1 wherein call disposition is performed in response to a subscriber's call-forward selection.

Turning now to FIG. 3c, if the wireless subscriber elects to forward the call, the wireless terminal 10, according to its programming, generates and sends a corresponding ResultNotification message (forward) containing a forwarding number (dest. DN) to the WAP Gateway 28 in step 90. In turn, the WAP Gateway 28 is programmed to receive the ResultNotification message (forward, dest. DN) from the wireless terminal 10 and forward it to the WTA Server 26 in step 92. There, according to its programming, the WTA Server 26 generates a Call Disposition Result message (forward) containing the forwarding number (dest. DN), and sends this message to the SCP 20 in step 94. The SCP 20 is programmed to receive the Call Disposition Result message (forward, dest. DN) from the WTA Server 26, generate a call control message (forward) containing the forwarding number (dest. DN), and send this message to the MSC/VLR in step 96. The MSC/VLR then performs a responsive call disposition action, i.e., it forwards the call to the forwarding number (dest. DN) in conventional fashion.

Figure 3D:
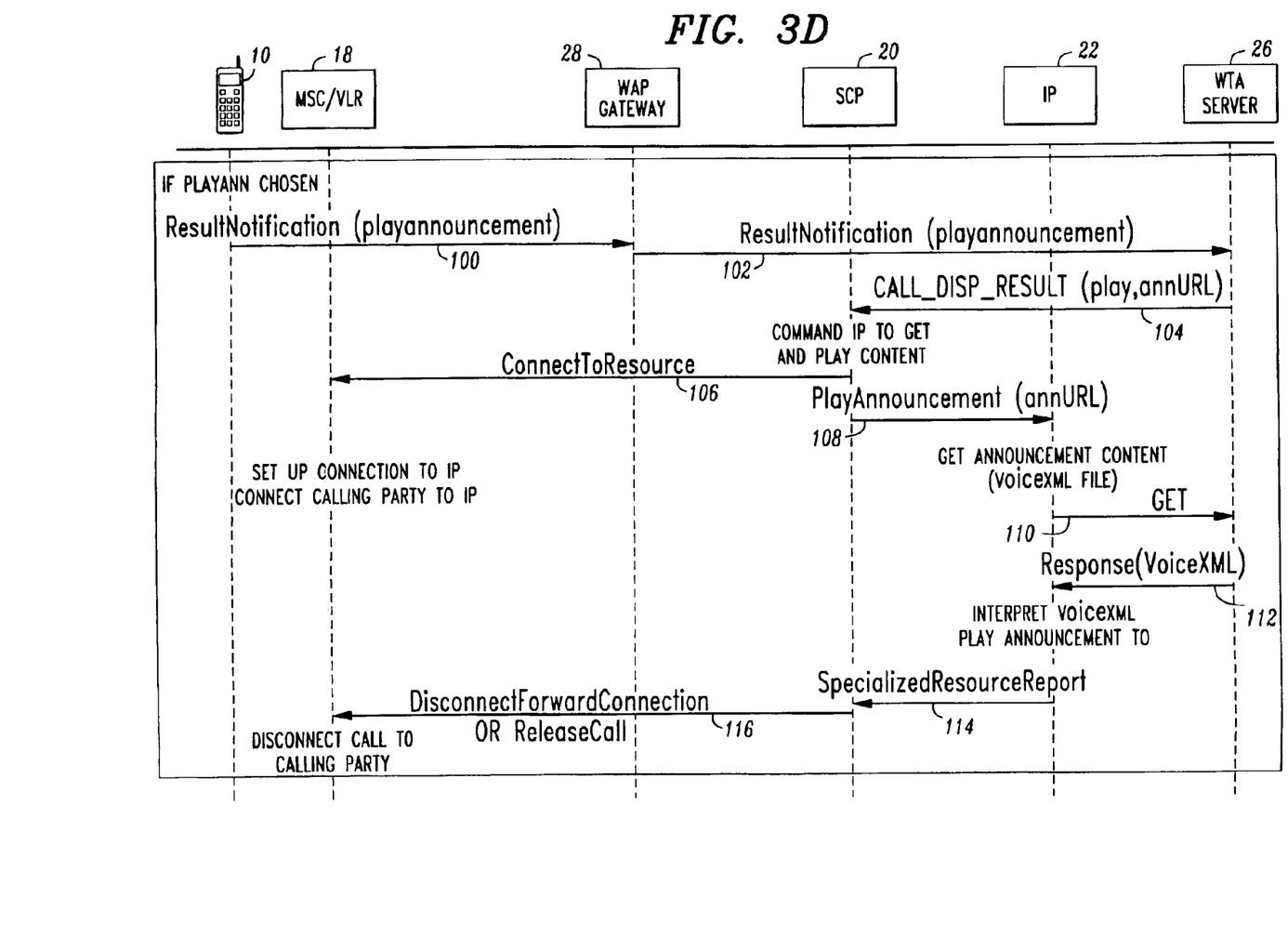
FIG. 3d is a flow diagram showing method steps performed in a second phase of dynamic call distribution service in the telecommunication system of FIG. 1 wherein call disposition is performed in response to a subscriber's play-announcement selection.

Turning now to FIG. 3d, if the wireless subscriber elects to play an announcement, the wireless terminal 10, according to its programming, generates and sends a corresponding ResultNotification message (playannouncement) to the WAP Gateway 28 in step 100. In turn, the WAP Gateway 28 is programmed to receive the ResultNotification message (play announcement) from the wireless terminal 10 and forward it to the WTA Server 26 in step 102. There, according to its programming, the WTA Server 26 generates a Call Disposition Result message (play-announcement) indicating the location (URL) of the announcement content, and sends this message to the SCP 20 in step 104. The remainder of the announcement-related processing is conventional in nature.

Thus, when the SCP 20 receives the Call Disposition Result message (playannouncement) from the WTA Server 26, it generates a ConnectToResource message. This message is sent to the MSC/VLR in step 106, which performs routine connection setup processing to connect the incoming call to the IP 22. In step 108, the SCP 20 sends a PlayAnnouncement message to the IP 22. This message contains an announcement URL address (annURL) that identifies the URL address of the announcement in the WTA Server 26. In step 110, the IP 22 sends an HTTP Get message to the WTA Server 26 to obtain the announcement file. In step 112, the WTA Server sends back a HTTP Response message to the IP 22 that contains an announcement voice file in a format such as XML (Extensible Markup Language) (VoiceXML). The IP 22 plays the announcement to the caller and then sends a SpecializedResourceReport Message to the SCP 20 in step 114. In step 116, the SCP 20 sends an intelligent network DisconnectForwardConnection message or a ReleaseCall message to the MSC/VLR 18, which performs a responsive call disposition action, i.e., it disconnects the call to the calling party in conventional fashion.

Accordingly, novel system and method for providing dynamic call disposition service to wireless terminals are disclosed. While various embodiments of the invention have been disclosed, it should be apparent that many variations and alternative embodiments could be implemented in accordance with the invention. It is understood, therefore, that the invention is not to be in any way limited except in accordance with the spirit of the appended claims and their equivalents.

Sequence Listing

Not applicable

What is claimed is:

1. In a wireless telecommunication network, a method for providing dynamic call disposition service on behalf of a wireless terminal having voice network telephone communication capability, comprising the steps of:

receiving a voice domain call to said wireless terminal at a voice network resource;

said wireless terminal representing a called terminal associated with a called party to whom said voice domain call is directed;

providing call disposition options to said wireless terminal in a data domain via a data network resource in response to said call to said wireless terminal; and performing a call disposition action relative to said call according to an option selection made at said wireless terminal.

2. A method in accordance with claim 1 wherein said providing and performing steps are performed while said wireless terminal is occupied with an existing call.

3. A method in accordance with claim 1 wherein said providing step includes generating a call disposition request message containing caller information, forming a data network-stored call disposition menu in response to said call disposition request message, and providing said menu to said wireless terminal.

4. A method in accordance with claim 1 wherein said providing step includes receiving a call for a wireless terminal, generating a trigger in response to said call, generating a call disposition request message containing caller information in response to said trigger, forming a call disposition menu in response to said call disposition request message, and providing said menu to said wireless terminal.

5. A method in accordance with claim 1 wherein said performing step includes processing said option selection and terminating said call in accordance with said processing.

6. A method in accordance with claim 1 wherein said performing step includes processing said option selection, generating a call disposition result message, generating a call control message in response to said call disposition result message, and terminating said call based on said call control message.

7. A method in accordance with claim 1 wherein said performing step includes receiving said option selection from said wireless terminal as a result notification message, forwarding said result notification message for processing, generating a call disposition result message in response to said result notification message, generating a call control message in response to said call disposition result message, and terminating said call based on said call control message.

8. A method in accordance with claim 1 wherein said call disposition action comprises delivering said call to said wireless terminal.

9. A method in accordance with claim 1 wherein said call disposition action comprises tearing down said call.

10. A method in accordance with claim 1 wherein said call disposition action includes forwarding said call to a destination other than said wireless terminal.

11. A method in accordance with claim 1 wherein said call disposition action includes connecting said call to an announcement playing resource.

12. In a wireless telecommunication system, a system for providing dynamic call disposition service on behalf of a wireless terminal having voice network telephone communication capability, comprising:
   voice network resource means for receiving a voice domain call to said wireless terminal;
   said wireless terminal representing a called terminal associated with a called party to whom said voice domain call is directed;
   data network resource means for providing call disposition options to said wireless terminal in a data domain in response to said call to said wireless terminal; and
   voice network means for performing a call disposition action relative to said call according to an option selection made at said wireless terminal.

13. A system in accordance with claim 12 wherein said providing means and said performing means are adapted to operate while said wireless terminal is occupied with an existing call.

14. A system in accordance with claim 12 wherein said providing means includes first means for generating a call disposition request message containing caller information, second means for forming a call disposition menu in response to said call disposition request message, and third means for providing said menu to said wireless terminal.

15. A system in accordance with claim 12 wherein said providing means includes first means for receiving a call for a wireless terminal, second means for retrieving a trigger in response to said call, third means for generating a call disposition request message containing caller information in response to said trigger, fourth means for forming a call disposition menu in response to said call disposition request message, and fifth means for providing said menu to said wireless terminal.

16. A system in accordance with claim 12 wherein said performing means includes first means for processing said option selection and second means for terminating said call in accordance with said processing.

17. A system in accordance with claim 12 wherein said performing means includes first means for processing said option selection, second means for generating a call disposition result message, third means for generating a call control message in response to said call disposition result message, and fourth means for terminating said call based on said call control message.

18. A system in accordance with claim 12 wherein said performing means includes first means for receiving said option selection from said wireless terminal as a result notification message, second means for forwarding said result notification message for processing, third means for generating a call disposition result message in response to said result notification message, fourth means for generating a call control message in response to said call disposition result message, and fifth means for terminating said call based on said call control message.

19. A system in accordance with claim 12 wherein said call disposition action comprises delivering said call to said wireless terminal.

20. A system in accordance with claim 12 wherein said call disposition action comprises tearing down said call.

21. A system in accordance with claim 12 wherein said call disposition action includes forwarding said call to a destination other than said wireless terminal.

22. A system in accordance with claim 12 wherein said call disposition action includes connecting said call to an announcement playing resource.

23. A voice network resource group for providing dynamic call disposition service on behalf of a wireless terminal in a voice network in cooperation with a data network resource group in a data network, comprising:
   a first voice network resource for communicating with said wireless terminal over an air interface, said first voice network resource being adapted to receive an incoming call to said wireless terminal, to generate a trigger in response to said incoming call, and to send said trigger to a second voice network resource;
   a second voice network resource adapted to receive a trigger and to send a call disposition request message for obtaining call disposition instructions from said wireless terminal to a data network resource group that also communicates with said wireless terminal over an air interface;
   said second voice network resource being further adapted to receive a call disposition result message from said data network resource group and to send a call control message to said first voice network resource; and
   said first voice network resource being further adapted to receive said call control message and to perform a call disposition action on behalf of said wireless terminal.

24. A data network resource group for providing dynamic call disposition service on behalf of wireless terminal in a data network in a data network in cooperation with a voice network resource group in a voice network, comprising:
   a first data network resource adapted to receive a call disposition request message from a voice network resource group relative to said wireless terminal that communicates with said voice network resource group over an air interface, and to send a call disposition menu to a second data network resource that also communicates with said wireless terminal over an air interface;
   a second data network resource adapted to receive said call disposition menu, perform content adaptation according to characteristics of said wireless terminal, and to send said adapted menu to said wireless terminal;
   said second data network resource being further adapted to receive a result notification message from said wireless terminal and to send said result notification message to said first data network resource; and
   said first data network resource being further adapted to receive said result notification message from said second data network resource and to send a call disposition message to said voice network resource group.

25. A method for providing dynamic call disposition service on behalf of a wireless terminal that is occupied with an existing voice call, comprising the steps of:

receiving an incoming call at a mobile switching center and sending a trigger from said mobile switching center to an intelligent network service control point;

receiving said trigger at said intelligent network service control point, determining caller identification, and sending a call disposition request message from the intelligent network service control point to a data network server;

receiving said call disposition request message at said data network server, forming a dynamic call disposition menu, and sending said dynamic call disposition menu from said data network server to a data network gateway;

receiving said call disposition menu at said data network gateway, adapting said menu as necessary to conform to display characteristics of said wireless terminal, and sending said menu from said data network gateway to said wireless terminal;

receiving said call disposition menu at said wireless terminal, displaying said menu in human-visible form, receiving a selection option input corresponding to an option in said menu, generating a result notification message, and sending said result notification message from said wireless terminal to said data network gateway;

receiving said result notification message at said data network gateway and forwarding said result notification message from said data network gateway to said data network server;

receiving said result notification message at said data network server, generating a call disposition result message, and sending said call disposition result message from said data network server to said intelligent network service control point;

receiving said call disposition message at said intelligent network service control point, generating a call control message, and sending said call control message from said intelligent network service control point to said mobile switching center; and receiving said call control message at said mobile switching center and performing a responsive call disposition action.

26. A system for providing dynamic call disposition service on behalf of a wireless terminal that is occupied with an existing voice call, comprising:

a mobile switching center programmed to receive an incoming call and to send a trigger to an intelligent network service control point;

an intelligent network service control point programmed to receive said feature request message from said mobile switching center, determine caller identification, and send a call disposition request message to a data network server;

a data network server programmed to receive said call disposition request message from said intelligent network service control point, form a dynamic call disposition menu, and send said dynamic call disposition menu to a data network gateway;

a data network gateway programmed to receive said call disposition menu from said data network server, adapt said menu as necessary to conform to display characteristics of said wireless terminal, and send said menu to said wireless terminal;

said wireless terminal being programmed to receive said call disposition menu from said data network gateway, display said menu in human-visible form, receive a selection option input corresponding to an option on said menu, generate a result notification message, and send said result notification message to said data network gateway;

said data network gateway being further programmed to receive said result notification message from said wireless terminal and forward said result notification message to said data network server;

said data network server being further programmed to receive said result notification message from said data network gateway, generate a call disposition result message, and send said call disposition result message to said intelligent network service control point;

said intelligent network service control point being further programmed to receive said call disposition message from said data network server, generate a call control message, and send said call control message to said mobile switching center; and said mobile switching center being further programmed to receive said call control message from said intelligent network service control point and perform a responsive call disposition action.

* * * * *